US 8,348,617 B2

(12) United States Patent
Machold (10) Patent No.: US 8,348,617 B2
(45) Date of Patent: Jan. 8, 2013

(54) METHOD FOR THE EMERGENCY BRAKING OF A WIND POWER PLANT AND A WIND POWER PLANT WITH A ROTOR BLADE PITCH CONTROL FOR EMERGENCY BRAKING

(75) Inventor: Winulf Machold, Hamburg (DE)

(73) Assignee: Nordex Energy GmbH, Norderstedt (DE)

(*) Notice: Subject to any disclaimer, the term of this patent is extended or adjusted under 35 U.S.C. 154(b) by 547 days.

(21) Appl. No.: 12/504,778

(22) Filed: Jul. 17, 2009

(65) Prior Publication Data

US 2010/0303622 A1    Dec. 2, 2010

(30) Foreign Application Priority Data

May 28, 2009   (EP) .................................... 09007124

(51) Int. Cl.
    *B63H 3/00*    (2006.01)
(52) U.S. Cl. ................. 416/155; 416/1; 416/40
(58) Field of Classification Search .................... 416/38, 416/40, 41, 43, 44, 61, 155, 1
See application file for complete search history.

(56) References Cited

U.S. PATENT DOCUMENTS 4,462,753 A * 7/1984 Harner et al. .................. 416/48

FOREIGN PATENT DOCUMENTS

| DE | 33 20 685 A1 | 12/1983 |
| DE | 10 2005 034 899 A1 | 2/2007 |
| DE | 10 2006 001 613 A1 | 12/2007 |
| EP | 1 701 034 A2 | 3/2006 |
| EP | 1 788 237 A2 | 11/2006 |
| WO | 2009/010059 A2 | 1/2009 |

* cited by examiner

*Primary Examiner* — Ninh H Nguyen
*Assistant Examiner* — Adam W Brown
(74) *Attorney, Agent, or Firm* — Vidas, Arrett & Steinkraus, P.A.

(57) ABSTRACT

Method for the emergency braking of a wind power plant, in which at least one rotor blade of the wind power plant is adjusted into its feathering position, wherein a first phase, in which the at least one rotor blade is adjusted with a first speed, and a second phase, in which the at least one rotor blade is adjusted as of a predetermined first blade pitch angle with a second speed, which is increased until a maximum speed is reached and/or until a second determined blade pitch angle is reached.

16 Claims, 7 Drawing Sheets

Fig. 1 (State of the Art)

Fig. 2 (State of the Art)

# METHOD FOR THE EMERGENCY BRAKING OF A WIND POWER PLANT AND A WIND POWER PLANT WITH A ROTOR BLADE PITCH CONTROL FOR EMERGENCY BRAKING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for the emergency braking of a wind power plant, in which at least one rotor blade of the wind power plant is adjusted in its feathering position. Furthermore, the invention relates to a wind power plant with at least one rotor blade and at least one rotor blade pitch device, which can set the blade pitch angle for the at least one rotor blade and can move the at least one rotor blade into its feathering position upon receipt of a control signal for an emergency braking.

The blade pitch angle of the rotor blade is defined as the angle that encloses the chord of the rotor blade with the rotation plane.

The feathering position of the rotor blade, also sometimes called the sail position, is the position of the rotor blade, in which the chord of the rotor blade is approximately perpendicular to the rotation plane of the rotor blade. In the feathering position, either the front edge or the rear edge of the rotor blade is turned into the wind such that no more lift can be created on the blade profile.

It is generally known to also move the rotor blades of the wind power plant into a feathering position during an emergency run with a nearly constant speed.

An apparatus for the pitch control of the sail position of the blade or blades of a wind turbine is known from DE 33 20 685 C2, the entire contents of which is incorporated herein by reference. It is described that the pitch control of the sail position with a constant, high speed can lead to excess blade load due to the considerable slowing (negative) torque and the reverse thrust that can be created by the blades. It is thus suggested, when moving the rotor blades into the sail position after the blade angle has been increased by up to one point in that the air flow over the blades no longer creates a positive torque on the wind turbine rotor, to reduce the speed of the pitch control of the sail position in order to minimize the slowing torque and the reverse thrust created by the blades and thus to minimize the blade load. It is also noted that, for safety reasons, the reduction of the pitch control speed when the blades near their sail position should not take place at the cost of the pitch control of the sail position with maximum speed while the air flow over the blades generates a positive shaft torque.

A wind energy plant with individual pitch devices is known from DE 10 2005 034 899 A1, the entire contents of which is incorporated herein by reference. When moving the rotor blade into its feathering position, a selector is provided that selects a controller regime at the beginning of the moving procedure that provides a high pitch control speed for the rotor blade. At point in time $t_2$, as of which the rotor blade has reached a critical blade angle of attack $\theta_0$, a lower pitch control speed is selected for the rotor blade.

A method and an apparatus for the braking of a wind power plant are known from EP 1 788 237 A2, the entire contents of which is incorporated herein by reference. It is provided here that, if the rotor blades are moved from a first position to a second position, the blade pitch angle changes with a first speed and then is pitch controlled with a second speed, wherein the second speed is slower than the first speed.

A method for the pitch control of the rotor blades during the stopping of the rotor is known from WO 2009/010059 A2, the entire contents of which is incorporated herein by reference. In this method, the rotor blades are moved into a position, in which no thrust can be absorbed by the rotor. When there is aerodynamic thrust, the rotor is then controlled such that the thrust is mainly zero or works against the movement direction of the tower with its first natural frequency.

A method for the stopping of the rotor of a wind power plant is known from EP 1 701 034 A2, the entire contents of which is incorporated herein by reference, in which the rotor blade is moved during a first vibration phase I with a first pitch control speed. In a directly subsequent phase II, in which the mast of the wind power plant is tilted against the wind, the pitch control speed of the rotor blade is reduced until the mast of the wind power plant has reached its maximum amplitude against the wind. In the phase III following the swinging back of the mast, the rotor blade is moved again with the first pitch control speed. The pitch control process thereby takes place within the first seconds.

The object of the invention is to reduce the loads on the rotor blades and the rotor blade connections and the tower head vibrations during the emergency braking of the wind power plant.

BRIEF SUMMARY OF THE INVENTION

The method according to the invention provides for the emergency braking of a wind power plant, in which at least one rotor blade of the wind power plant is adjusted in its feathering position. In general, the pitch control of the blade pitch angle, which is also called the pitch angle, into the feathering position works like an aerodynamic brake and is independent of other components, in order to move the wind power plant into the shutdown position. In the case of the method according to the invention, the pitch control process, with which the rotor blade is brought into its feathering position, is divided into a first phase and a second phase. In the first phase, which starts immediately after the movement into the feathering position has begun, the at least one rotor blade is adjusted with a first speed. In the second phase, which with regard to time comes after the first phase but does not have to come right after the first phase, the at least one rotor blade is adjusted with a second speed as of a predetermined first blade pitch angle. The second speed is increased until a maximum speed is reached and/or a second predetermined blade pitch angle is reached.

The invention is based on the knowledge that, in the second phase of the emergency run since the speed of rotation of the rotor and the drive train is already reduced and there is only slight lift on the rotor blade, an increase in the pitch speed is possible without a simultaneous increase in the loads on the rotor blades and of the tower head vibrations. A special advantage of the method according to the invention is that, in the first phase in which the rotor blade still absorbs torque from the wind and thus engages strong forces from it, a pitch control of the rotor blade can take place with a slower speed than previously known from the state of the art. Through the method according to the invention, the forces affecting the wind power plant and in particular the rotor blades and tower head can be reduced without increasing the period of time until the feathering position is reached. The impact moment at the blade connection and the displacement of the tower head increase when the braking process is initiated. These are dampened vibrations, which stop after the braking process is complete. With the method according to the invention, the amplitudes of these vibrations can be considerably reduced; in particular, the low pitch control speed in the first phase is vibration-dampening for the tower head vibration. In contrast to EP 1 701 034 A2, the entire contents of which is incorporated herein by reference, the method according to the invention first performs the pitch control with a lower speed and the transition to the second phase takes place independently of the displacement of the tower head.

In a preferred embodiment of the method according to the invention, the first speed with which the pitch control of the rotor blade takes place in the first phase is constant over the duration of the first phase.

The second speed is preferably continuously or gradually increased in the second phase. Depending on the embodiment of the used drives for the rotor blade pitch control, it can be advantageous to increase the second speed in individual steps or to continuously increase the second speed. In order to avoid jerky movements during the increase in speed in individual steps, it has proven advantageous to modify the acceleration values during the transition to the higher speed. The greater the difference between the values of the sequential steps, the lower the acceleration value can be selected.

In a preferred embodiment, the first predetermined blade pitch angle lies in an area as of which lower load amounts occur on the rotor blade, preferably between 30° and 50°.

In an advantageous embodiment of the method according to the invention, a third phase is provided, which is run through after the first phase and before the second phase of the pitch control process. For the third phase, a third predetermined blade pitch angle is defined, which is smaller than the first predetermined blade pitch angle. If the rotor blade reaches the third predetermined blade pitch angle, then the speed for the pitch control of the rotor blade is decreased in the third phase. Through this reduction, the generally known fact is accommodated that a negative rotor thrust, i.e. a reversal of the torque, can occur in an angle area during the pitch control of the rotor blade. The initial first pitch control speed is preferably reduced in this critical phase for the rotor blade. The pitch control of the at least one rotor blade advantageously takes place with a constant speed in this third phase. The third predetermined blade pitch angle is approx. 10° to 20° smaller than the first predetermined blade pitch angle, with which the second phase of the pitch control process begins.

It has proven to be advantageous to reduce the speed of the pitch control of the rotor blade before the feathering position has been reached so that the rotor blade can be stopped in the feathering position without introducing loads that are too large to the wind power plant and its tower head. This reduction of the pitch control speed of the rotor blade preferably takes place as of the second predetermined angle position, which is at the most 10° smaller than the feathering position.

The wind power plant according to the invention has at least one rotor blade and at least one rotor blade pitch device, which set the blade pitch angle for the at least one rotor blade and can move the at least one rotor blade into its feathering position upon receipt a control signal for an emergency braking. In technical terminology, the rotor blade pitch device is also called a pitch system. The rotor blade pitch device according to the invention moves the at least one rotor blade into its feathering position, wherein in the first phase the pitch control of the rotor blade takes place with a first speed and as of a first predetermined blade pitch angle the pitch control of the rotor blade takes place in a second phase with a second speed. The rotor blade pitch device increases the second speed until a maximum speed is reached and/or a second predetermined angle position is reached. The rotor blade pitch device performs the method for the pitch control of the blade pitch angle automatically when the control signal is applied to the rotor blade pitch device.

According to the invention, the rotor blade pitch device in the first phase selects a constant speed and increases the second speed in the second phase continuously or gradually. When the maximum speed is reached, it is then maintained.

In a preferred embodiment, the first predetermined blade pitch angle lies in an area as of which considerably lower loads can be expected, preferably between 30° and 50°. Once this first predetermined blade pitch angle is reached during pitch control, the rotor blade pitch device switches to the second phase.

For the rotor blade pitch device, the speed for the pitch control of the rotor blade is advantageously decreased in a third phase as of a third predetermined blade pitch angle, which is smaller than the first predetermined blade pitch angle. In the third phase, in which a reversal of the torques affecting the rotor blade can take place, the pitch control of the rotor blade takes place with a speed that is less than the first speed in the first phase.

The third blade pitch angle is preferably 10° to 20° smaller than the first blade pitch angle so that the rotor blade in the third phase runs through an angle area of 10° to 20° with the third pitch control speed.

The rotor blade pitch device preferably reduces the speed of the rotor blade when a second predetermined blade pitch angle is reached that is close to the feathering position.

BRIEF DESCRIPTION OF EACH OF THE FIGURES OF THE DRAWINGS

The invention is explained in greater detail below through three exemplary embodiments. The drawings show in:

FIGS. 2a, b the pitch control speed and the blade pitch angle over time during a braking procedure according to the state of the art, FIG. 3 a flow chart for a braking procedure in a first embodiment of the method according to the invention, FIGS. 4a, b the pitch control speed and the blade pitch angle over time in a first embodiment of the method according to the invention, FIG. 5 a flow chart for a braking procedure in a second embodiment of the method according to the invention, FIGS. 6a, b the pitch control speed and the blade pitch angle over time in a second embodiment of the method according to the invention.

DETAILED DESCRIPTION OF THE INVENTION

Figure 1:
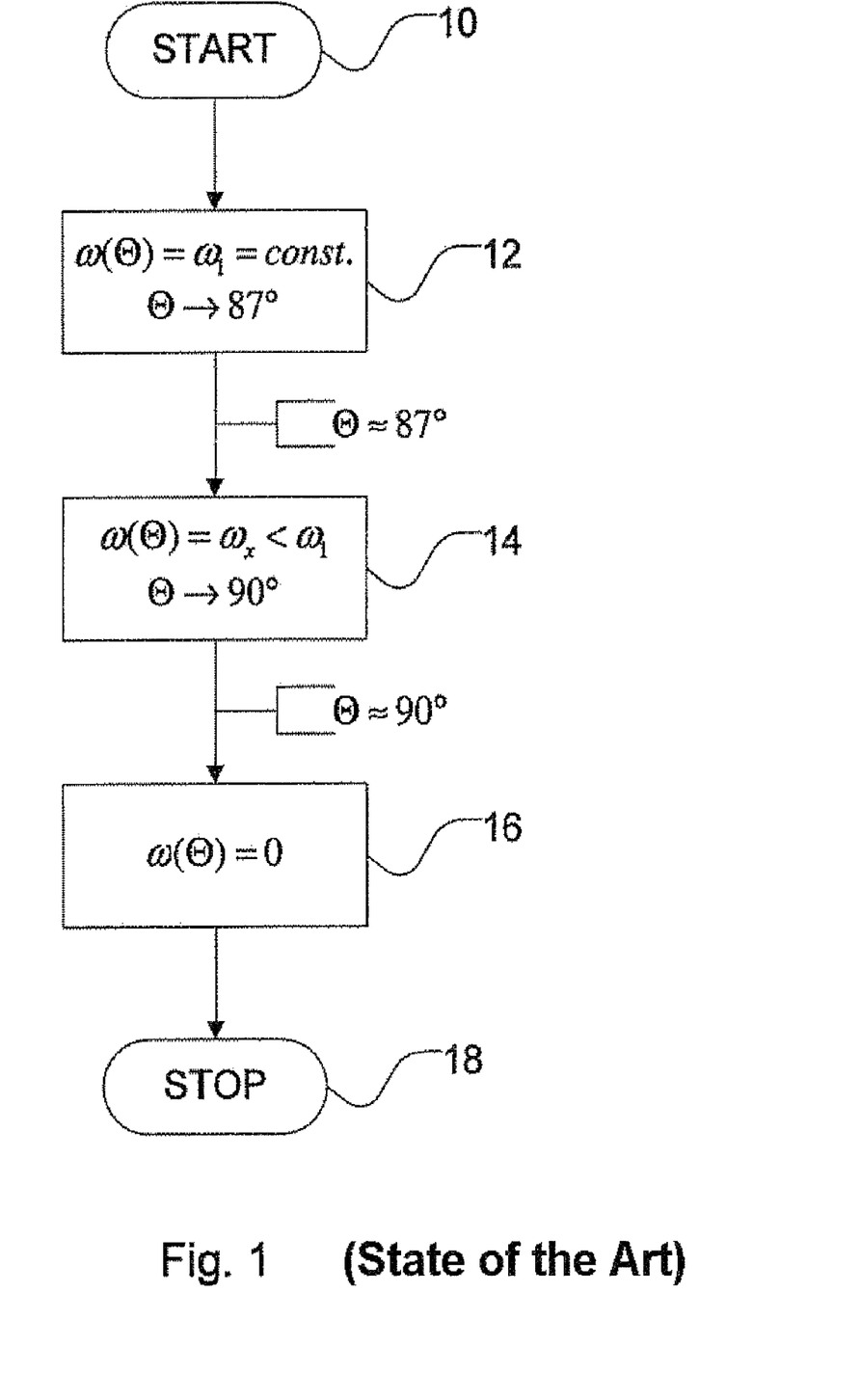
FIG. 1 a flow chart for a braking procedure according to the state of the art.

While this invention may be embodied in many different forms, there are described in detail herein a specific preferred embodiment of the invention. This description is an exemplification of the principles of the invention and is not intended to limit the invention to the particular embodiment illustrated FIG. 1 shows a flow chart for a braking procedure according to the state of the art. The brake program in step 10 is started for example after a signal for an emergency braking is received. In step 12, the pitch control of the rotor blade with constant angular velocity $\omega_1$ takes place in the direction of the feathering position. As of a blade pitch angle $\Theta$ of nearly 87°, the pitch control of the rotor blade takes place up until the feathering position is reached in accordance with step 14 with a slower angular velocity $\omega_x < \omega_1$. After the end position of the rotor blade is reached at nearly 90°, the angular velocity $\omega$ in step 16 is reduced to the value 0 and the brake program ends in step 18.

Figure 2:
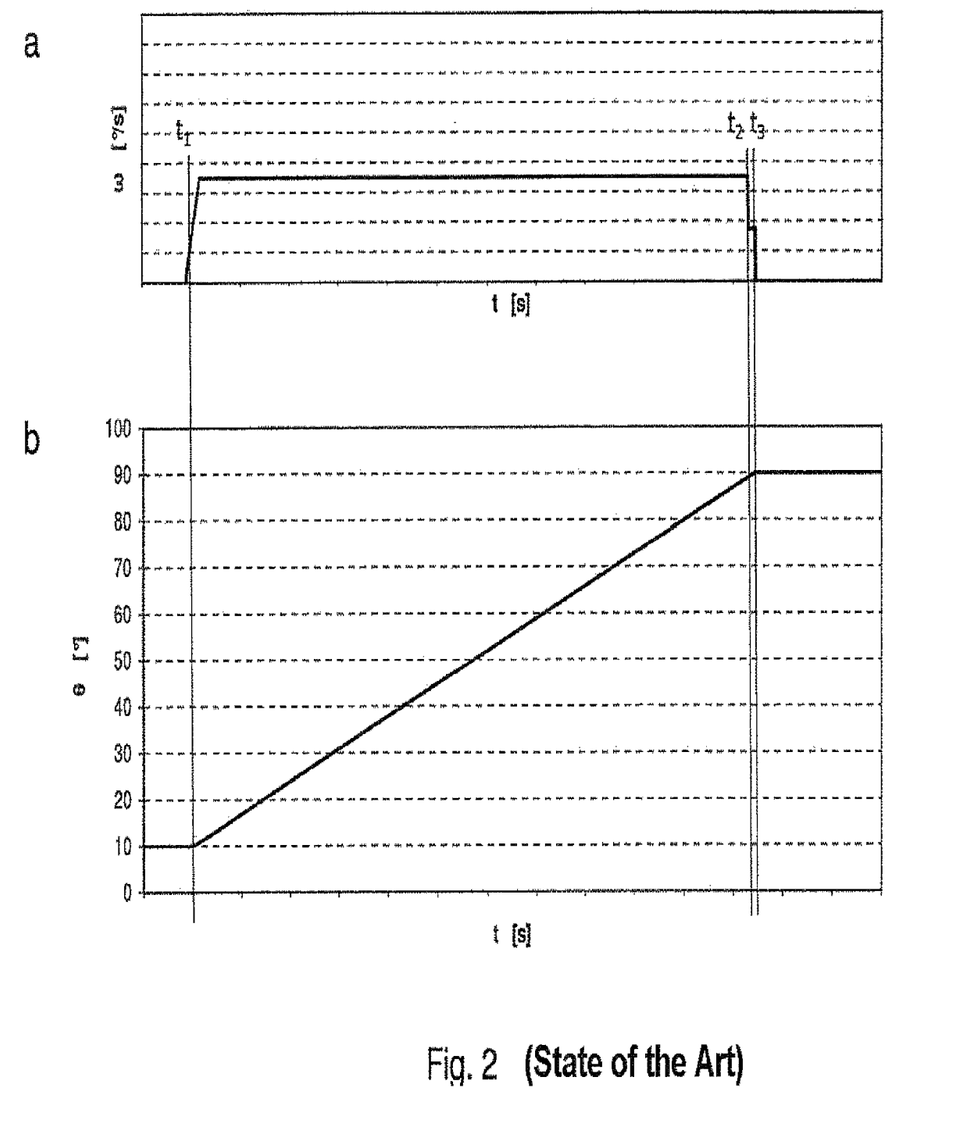

The FIGS. 2a and b show the temporal progression of the pitch control speed $\omega$ and the blade pitch angle $\Theta$ according to the method described in FIG. 1. A stationary wind and a slight cross wind of 8° are assumed. The wind power plant is in production mode at nominal power, wherein the blade pitch angle $\Theta$ is approx. 10°. At point in time $t_1$, a load rejection takes place and the generator speed increases to a value considerably above the nominal speed. This speed increase triggers the brake program. The pitch control of the rotor blade takes place with a constant angular velocity $\omega_1$. At point in time $t_2$, the rotor blade reaches a pitch control angle $\Theta$ of nearly 87°. The angular velocity $\omega$ is then reduced to a value $\omega_x$ less than $\omega_1$. When the feathering position is reached at point in time $t_3$, the angular velocity drops to the value $\omega=0$.

Figure 3:
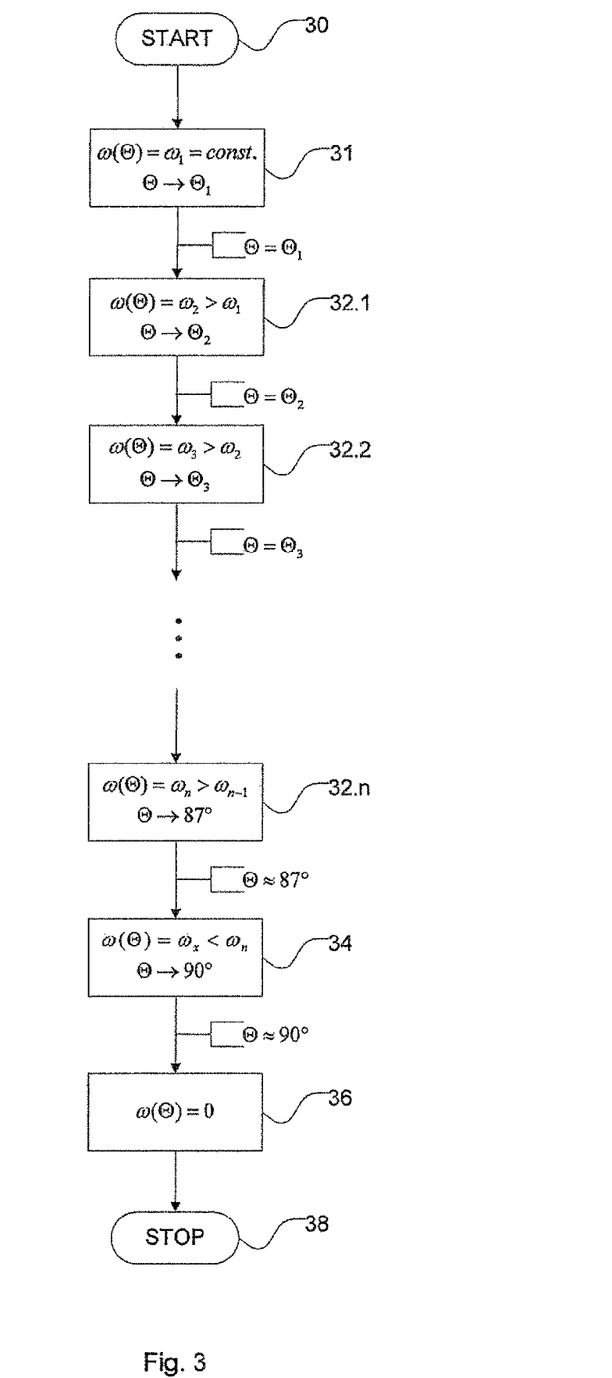

FIG. 3 shows a flow chart for the method according to the invention. The brake program is started is step 30. This can for example take place upon receipt of a signal for an emergency braking. The rotor blade is moved in the direction of the feathering position with a constant wind speed $\omega_1$ until a first defined angle position $\Theta_1$ is reached. The angular velocity $\omega$ is increased gradually in the following steps 32.1 to 32.$n$ ($\omega=\omega_2, \omega_3, \ldots, \omega_n$). As of a blade pitch angle $\Theta$ of nearly 87°, the pitch control of the rotor blade takes place up until the feathering position is reached in accordance with step 34 with a slower angular velocity $\omega_x$. After the end position of the rotor blade is reached at nearly 90°, the angular velocity $\omega$ in step 36 is reduced to the value 0 and the brake program ends in step 38.

Figure 4:
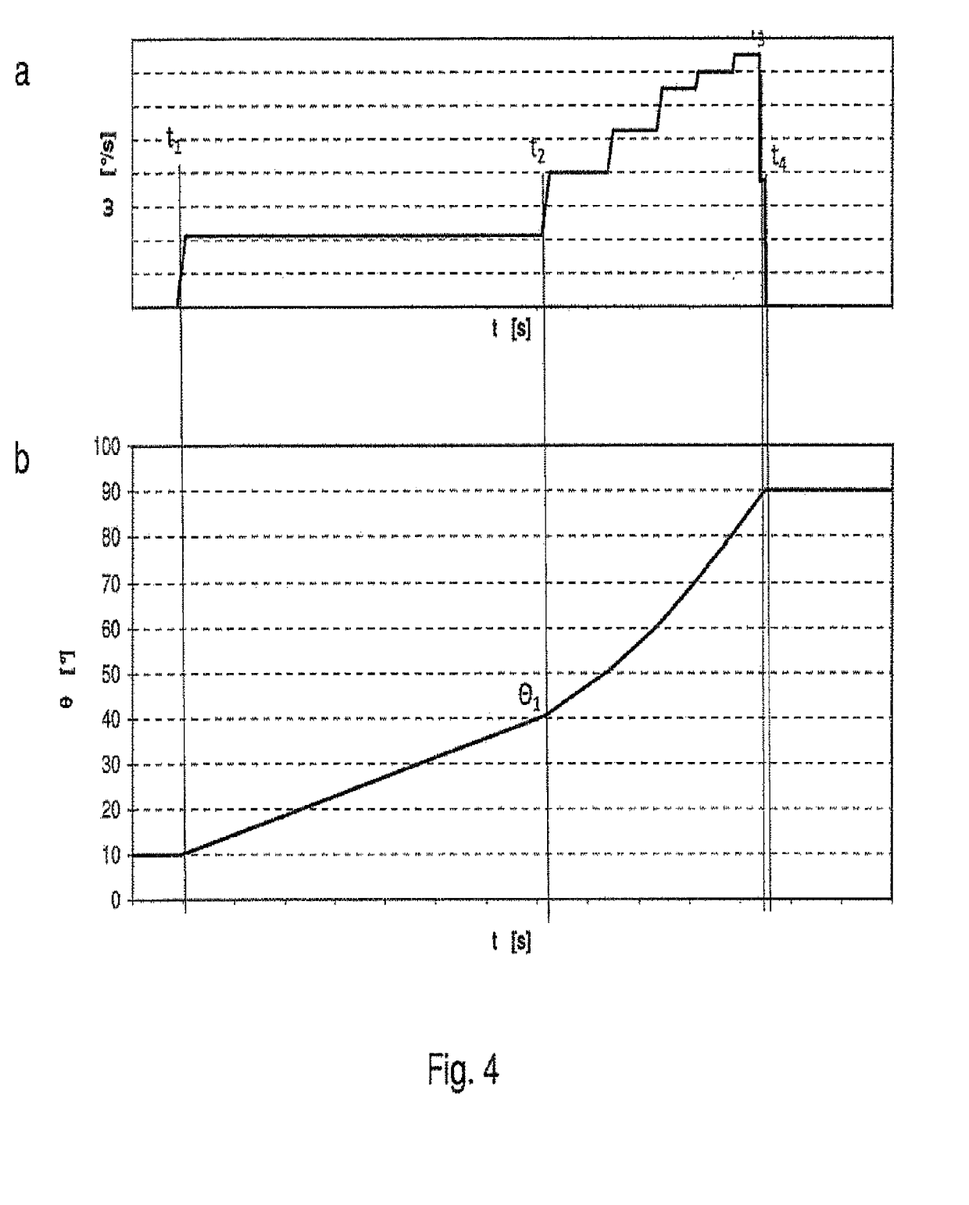

The FIGS. 4a and b show the temporal progression of the pitch control speed $\omega$ and the blade pitch angle $\Theta$ according to the method described in FIG. 3. The same framework conditions are assumed as in the example from the state of the art. The brake program is triggered at point in time $t_1$. The pitch control of the rotor blade takes place with a first constant angular velocity $\omega_1$. The angular velocity $\omega$ is gradually increased when a predetermined blade pitch angle $\Theta_1$ is reached at point in time $t_2$ ($\omega=\omega_2, \omega_3, \ldots, \omega_n$). At point in time $t_3$, the rotor blade reaches a pitch control angle $\Theta$ of nearly 87°. The angular velocity $\omega$ is then reduced to a value $\omega_x$ less than $\omega_2$. When the feathering position is reached at point in time $t_4$, the angular velocity drops to the value $\omega=0$.

Figure 5:
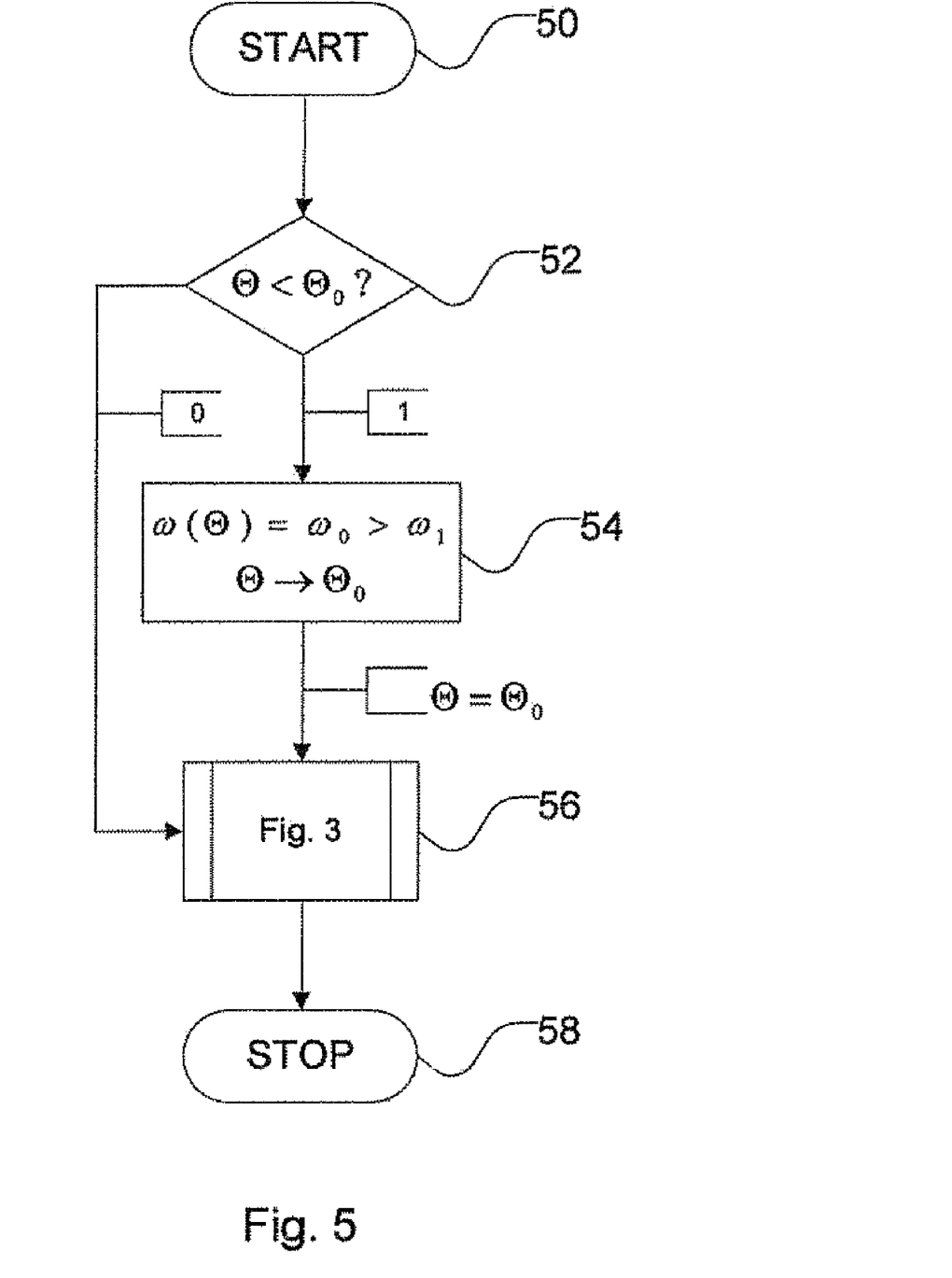

FIG. 5 shows a flow chart for an enhanced variant of the method according to the invention. In the example shown, the brake program is started in step 50. The current blade pitch angle $\Theta$ is queried in step 52. If the value of the current blade pitch angle $\Theta$ is greater than or equal to a specified blade pitch angle $\Theta_0$, the brake program runs out according to the method according to the invention in accordance with step 56. If the current blade pitch angle $\Theta$ is smaller than the specified blade pitch angle $\Theta_0$, the blade in step 54 is adjusted with an angular velocity $\omega_0$, wherein $\omega_0$ is greater than the angular velocity $\omega_1$, with which the brake program according to the invention is started. The amount of the angular velocity $\omega_0$ can be constant or can decrease gradually. When a specified blade pitch angle $\Theta_0$ is reached, the brake program in step 56 is resumed with the method according to the invention and is ended when the feathering position in step 58 is reached.

Figure 6:
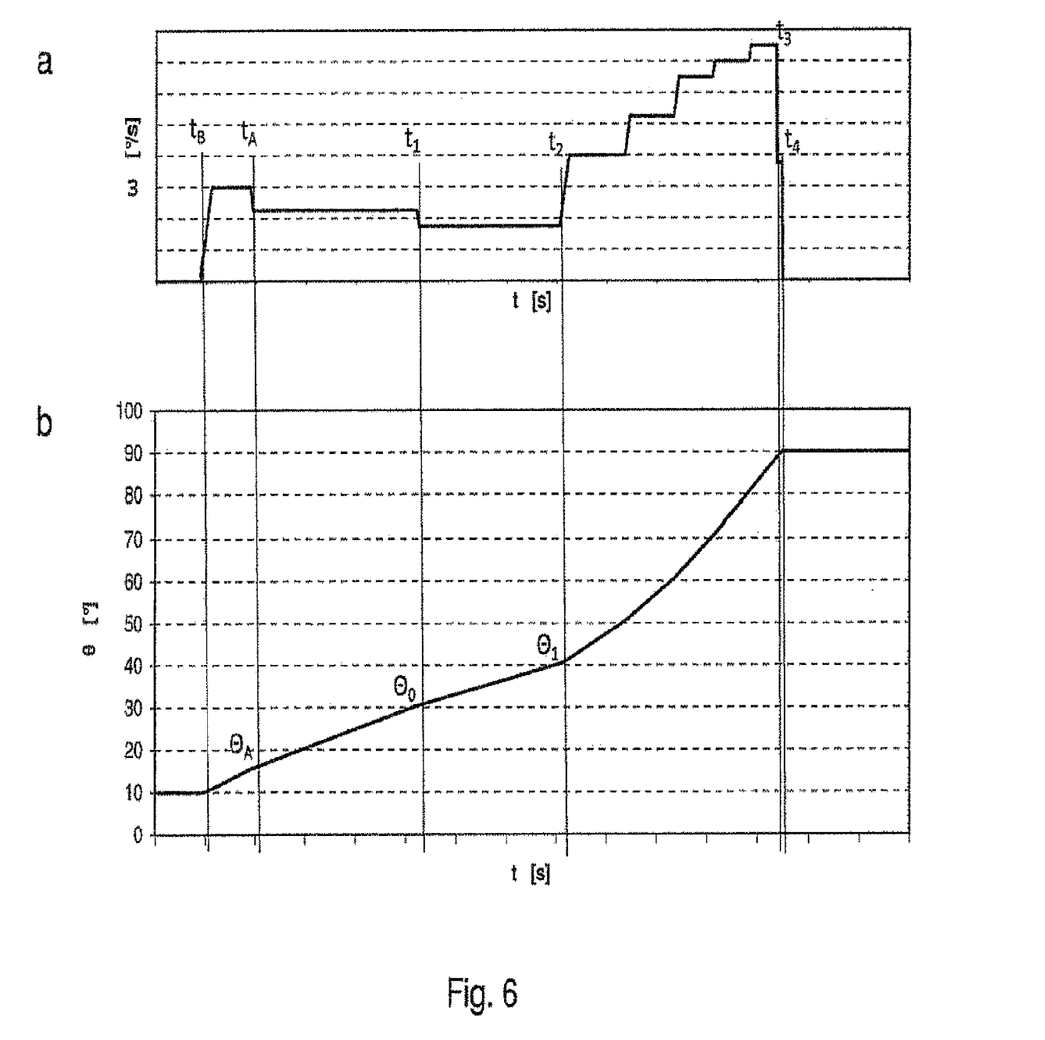

The FIGS. 6a and b show the temporal progression of the pitch control speed $\omega$ and the blade pitch angle $\Theta$ according to the method described in FIG. 5. The same framework conditions are again assumed as in the example from the state of the art. The wind power plant is in production mode at nominal power, wherein the blade pitch angle $\Theta$ is approx. 10°. At point in time $t_B$, a gust hits the wind power plant and the rotor blade is adjusted to a blade pitch angle $\Theta_A$ for the pitch control of the speed. At point in time $t_A$, a load rejection takes place and the generator speed increases to a value above the nominal speed. This speed increase triggers the brake program. Since at this point in time $t_A$ the current blade pitch angle $\Theta_A$ is less than the specified blade pitch angle $\Theta_0$, the rotor blade is adjusted with a first constant angular velocity $\omega_0$. After the blade pitch angle $\Theta_0$ is reached, the brake program is resumed according to the already described method according to the invention. The rotor blade is adjusted with a second constant angular velocity $\omega_1$, wherein $\omega_1 < \omega_0$. The angular velocity $\omega$ is gradually increased when a predetermined blade pitch angle $\Theta_1$ is reached ($\omega=\omega_2, \omega_3, \ldots, \omega_n$). At point in time $t_3$, the rotor blade reaches a pitch control angle $\Theta$ of nearly 87°. The angular velocity then drops to $\omega_x$. When the feathering position is reached at point in time $t_4$, the angular velocity drops to the value $\omega=0$.

Figure 7:
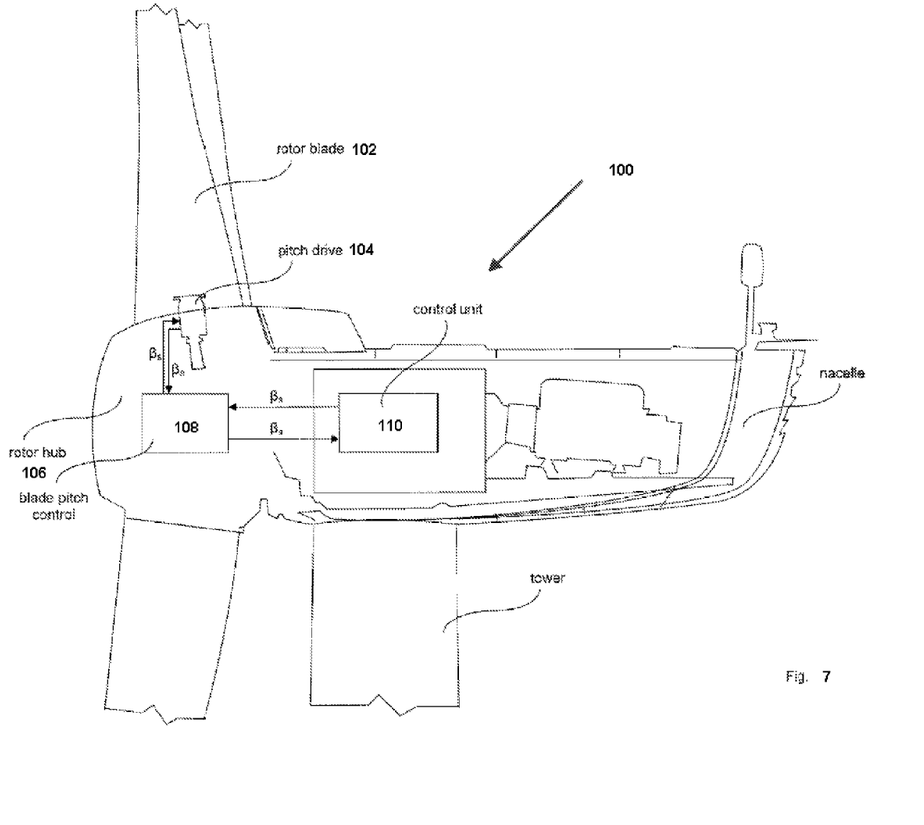
FIG. 7 shows the wind power plant, pitch device and rotor blade.

FIG. 7 shows a wind power plant 100, with a rotor blade 102 and a blade pitch drive 104, located in the rotor hub 106, which adjusts the blade pitch angle for the rotor blade. The pitch drive 104 communicates with a blade pitch control 108, which provides a set point for the pitch angle ($\beta_s$) and receives the actual value of the pitch angle ($\beta_a$). The set point ($\beta_s$) for the blade angle is provided by a control unit 110 which also receives the actual value ($\beta_a$) of the pitch angle.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the emergency braking of a wind turbine, in which at least one rotor blade of the wind turbine is adjusted into its feathering position, characterized by: a first phase, in which the at least one rotor blade is adjusted with a first speed, and a second phase, in which the at least one rotor blade is adjusted as of a first predetermined blade pitch angle with a second speed, which is increased until a maximum speed is reached and/or until a second predetermined blade pitch angle is reached.

2. The method according to claim 1, characterized in that the first speed is constant in the first phase.

3. The method according to claim 1, characterized in that the second speed is increased continuously or gradually in the second phase.

4. The method according to claim 1, characterized in that the first predetermined blade pitch angle lies in an area, in which there are lower loads on the rotor blade than at the beginning of the pitch control process.

5. The method according to claim 1, characterized in that the first predetermined blade pitch angle has a value of 30° to 50°.

6. The method according to claim 1, characterized in that as of a third predetermined blade pitch angle, which is smaller than the first predetermined blade pitch angle, the speed for the pitch control of the rotor blade is reduced in a third phase.

7. The method according to claim 6, characterized in that the third predetermined blade pitch angle is 10° to 20° smaller than the first predetermined blade pitch angle.

8. A wind turbine with at least one rotor blade and a pitch system comprising a pitch control for adjusting the at least one rotor blade, the pitch control comprising a brake program, the brake program beginning upon receipt of a control signal for an emergency braking, the brake program comprising instructions to move the at least one rotor blade into its feathering position, characterized in that the instructions to move the at least one rotor blade into its feathering position include instructions to:

adjust the rotor blade with a first speed in a first phase, and as of a first predetermined blade pitch angle adjust the rotor blade in a second phase with a second speed, which is increased until a maximum speed is reached and/or a second predetermined blade pitch angle is reached.

9. The wind turbine according to claim 8, characterized in that the first speed is constant in the first phase.

10. The wind turbine according to claim 8, characterized in that the second speed is increased continuously or gradually in the second phase.

11. The wind turbine according to claim 8, characterized in that the first predetermined blade pitch angle lies in an area, as of which there are lower loads on the rotor blade, in particular between 30° and 50°.

12. The wind turbine according to claim 8, characterized in that the instructions of the brake program further include instructions to, as of a third predetermined blade pitch angle which is smaller than the first predetermined blade pitch angle, reduce the speed for the pitch control of the rotor blade in a third phase.

13. The wind turbine according to claim 12, characterized in that there is a constant speed in the third phase.

14. The wind turbine according to claim 12, characterized in that the third predetermined blade pitch angle is 10° to 20° smaller than the first predetermined blade pitch angle.

15. The wind turbine according to claim 8, characterized in that the instructions of the brake program further include instructions to reduce the speed when the second predetermined blade pitch angle is reached.

16. The wind turbine according to claim 8, wherein the brake program ends when the feathering position is reached.

* * * * *